United States Patent
Dalal et al.

(10) Patent No.: US 10,607,241 B2
(45) Date of Patent: Mar. 31, 2020

(54) IDENTIFYING POTENTIAL CONSUMERS FOR SERVICE PROVIDER MARKETPLACE

(71) Applicant: Microsoft Technology Licensing, LLC, Redmond, WA (US)

(72) Inventors: Onkar Anant Dalal, Santa Clara, CA (US); Yi Zhang, Sunnyvale, CA (US); Shuo Miao, Sunnyvale, CA (US); Yiran Pang, Mountain View, CA (US); Ruslan Zagatskiy, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 515 days.

(21) Appl. No.: 15/334,106

(22) Filed: Oct. 25, 2016

(65) Prior Publication Data

US 2018/0114232 A1    Apr. 26, 2018

(51) Int. Cl.
 *G06Q 30/02* (2012.01)
 *G06Q 50/00* (2012.01)

(52) U.S. Cl.
 CPC ......... *G06Q 30/0201* (2013.01); *G06Q 50/01* (2013.01)

(58) Field of Classification Search
 None
 See application file for complete search history.

(56) References Cited

U.S. PATENT DOCUMENTS 8,560,471 B2 * 10/2013 Shama .................. G06Q 30/02 706/13
10,229,357 B2 * 3/2019 Jin .......................... G06N 3/08

(Continued)

FOREIGN PATENT DOCUMENTS

KR    10201384930    *  7/2013
WO    2018080731        5/2018

OTHER PUBLICATIONS

Aziz, Abdul. "Grid Management Architecture for Efficient and Scalable Scheduling of Workflow Applications." 2007. Southern Methodist University, ProQuest Dissertations Publishing. (Year: 2007).*

(Continued)

*Primary Examiner* — Matthew S Gart
*Assistant Examiner* — Tiera J Fletcher
(74) *Attorney, Agent, or Firm* — Schwegman Lundberg & Woessner, P.A.

(57) ABSTRACT

A system, a machine-readable storage medium storing instructions, and a computer-implemented method are described herein for a Potential Consumer Engine identifies profile data of a target member account accessible in a social network service during a period of time equal in length to a pre-submission time period. The Potential Consumer Engine identifies channel data and assembles feature vector data for the target member account. The Potential Consumer Engine inputs into generalized linear mix model the feature vector data. The Potential Consumer Engine receives predictive output from the generalized linear mix model. The predictive output indicative of a current probability of the target member account joining the freelancer marketplace.

20 Claims, 6 Drawing Sheets

(56) References Cited

U.S. PATENT DOCUMENTS

| | | |
|---|---|---|
| 2004/0138826 A1* | 7/2004 | Carter, Jr. ............. G16C 20/10 |
| | | 702/27 |
| 2004/0215553 A1 | 10/2004 | Gang et al. |
| 2008/0222640 A1 | 9/2008 | Daly et al. |
| 2010/0161404 A1 | 6/2010 | Taylor |
| 2012/0096352 A1 | 4/2012 | Maor et al. |
| 2014/0279352 A1 | 9/2014 | Schaefer et al. |
| 2015/0347917 A1 | 12/2015 | Hua et al. |
| 2015/0381552 A1* | 12/2015 | Vijay ..................... H04L 51/32 |
| | | 709/206 |
| 2016/0036679 A1 | 2/2016 | Johnson et al. |
| 2016/0063543 A1* | 3/2016 | Kernan ............. G06Q 30/0253 |
| | | 705/14.51 |
| 2016/0149850 A1 | 5/2016 | Pan et al. |
| 2017/0032144 A1* | 2/2017 | Kim ................... G06F 21/6245 |
| 2017/0140285 A1* | 5/2017 | Dotan-Cohen ........ G06F 3/038 |
| 2017/0372268 A1* | 12/2017 | Ilan ........................ G06N 20/00 |
| 2018/0308123 A1* | 10/2018 | Zhong ................ G06Q 30/0273 |

OTHER PUBLICATIONS

"International Application Serial No. PCT/US2017/054518, International Search Report dated Dec. 22, 2017", 2 pgs.

"International Application Serial No. PCT/US2017/054518, Written Opinion dated Dec. 22, 2017", 7 pgs.

Reddy, et al., "Using Context Annotated Mobility Profiles to Recruit Data Collectors in Participatory Sensing", (retrieved on Nov. 30, 2017). Retrieved from the Internet<URL: http://www.remap.ucla.edu/jburke/publications/Reddy-et-al-2009_Using-content-annotated-mobility-profiles.pdf>, (2009).

* cited by examiner

IDENTIFYING POTENTIAL CONSUMERS FOR SERVICE PROVIDER MARKETPLACE

TECHNICAL FIELD

The present disclosure generally relates to data processing systems. More specifically, the present disclosure relates to methods, systems and computer program products for predicting actions of one or more member accounts.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network," "social network service" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

Figure 1:
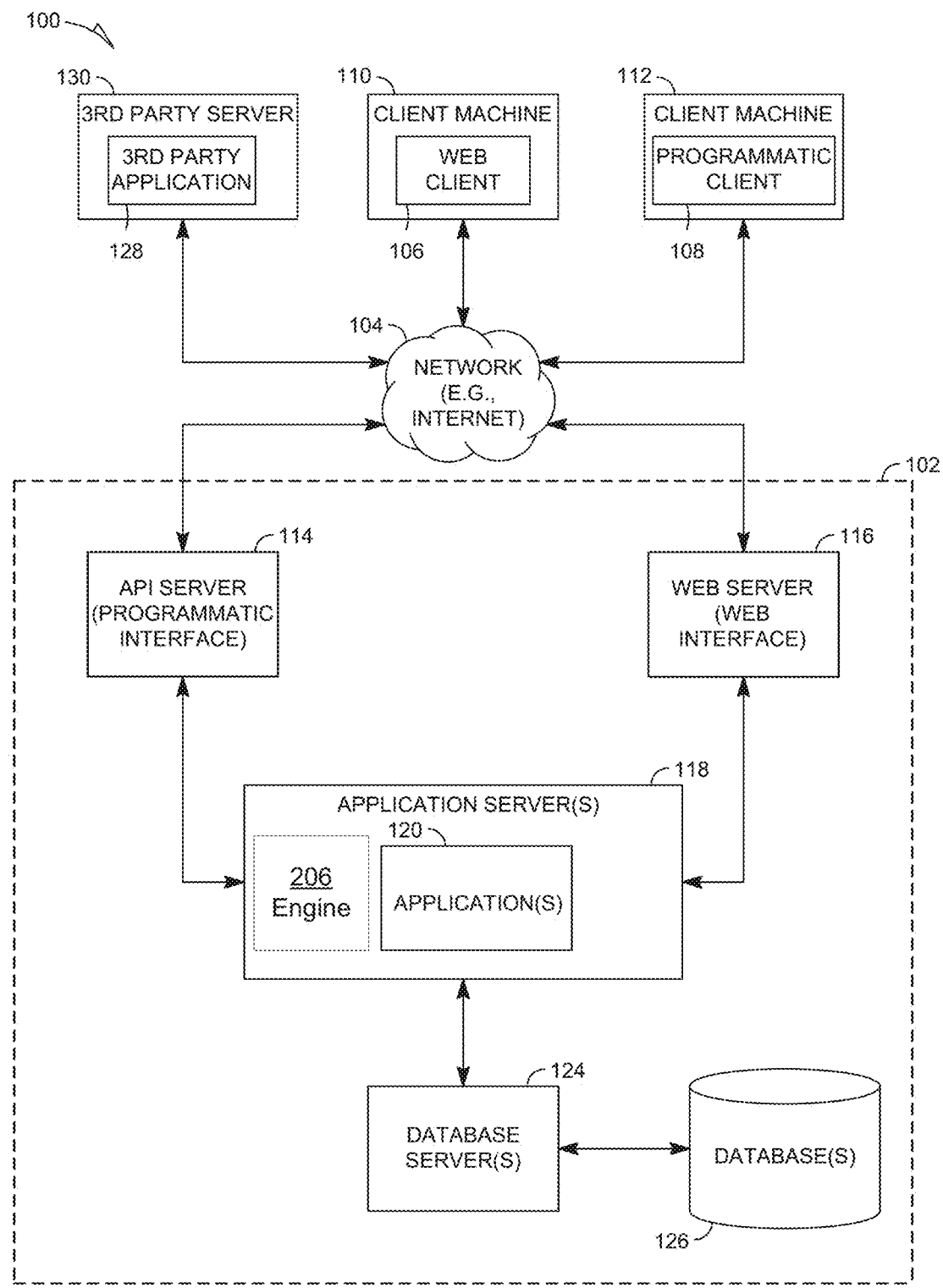
FIG. 1 is a block diagram showing the functional components of a social networking service, according to various embodiments.

The present disclosure describes methods and systems for predicting a likelihood a target member account is a potential consumer account in a freelancer marketplace. In the following description, for purposes of explanation, numerous specific details are set forth in order to provide a thorough understanding of the various aspects of different embodiments described herein.

A system, a machine-readable storage medium storing instructions, and a computer-implemented method are described herein for a Potential Consumer Engine that identifies behaviours of a plurality of consumer accounts of a freelancer marketplace that occurred during a period of time prior to joining the freelancer marketplace or prior to submitting a request-for-proposal in the freelancer marketplace. The Potential Consumer Engine continually updates one or more features of a prediction model according to the identified behaviours. The Potential Consumer Engine assembles a feature vector according to target member account data and encoded instructions representing the updated features in order to calculate whether the target member is behaving similarly to the consumer accounts just prior to when those consumer accounts joined the freelancer marketplace or submitted a request-for-proposal in the freelancer marketplace. It is understood that a consumer account is a member account that orders and purchases one or more freelance services from freelancer accounts via the freelancer marketplace.

In various example embodiments, the Potential Consumer Engine identifies profile data of a target member account accessible in a social network service during a period of time equal in length to a pre-submission time period. The Potential Consumer Engine identifies channel data generated by the target member account during the period of time equal in length to the pre-submission time period. The Potential Consumer Engine assembles, according to encoded rules of a prediction model (such as, for example, a generalized linear mix model), feature vector data for the target member account. Each encoded rule comprises one or more pre-defined features predictive of a measure of probability of a given member account joining the freelancer marketplace. The Potential Consumer Engine inputs into the prediction model the feature vector data for the target member account. The Potential Consumer Engine receives predictive output from the prediction model. The predictive output is indicative of a current probability of the target member account joining the freelancer marketplace.

It is understood that a pre-defined feature is based on raw data, attributes, searches, browsing patterns and actions of a given member account internal in the social network service and external to the social network service. It is further understood that one or more service provider accounts belong to the freelancer marketplace. Each service provider account sells a type of service to one or more consumer accounts that belong to the freelancer marketplace. The freelancer marketplace can be referred to as a service provider marketplace as well.

According to various exemplary embodiments, the Potential Consumer Engine may be executed for the purposes of both off-line training for generating, training, and refining the prediction model.

Various example embodiments further include encoded instructions that comprise operations to generate a user interface(s) and various user interface elements. The user interface and the various user interface elements can be representative of any of the operations, data, models, output, pre-defined features, member accounts, notifications, profile data, channel data and one or more periods of time as described herein. In addition, the user interface and various user interface elements are generated by the Potential Consumer Engine for display on a computing device, a server computing device, a mobile computing device, etc.

As described in various embodiments, the Potential Consumer Engine may be a configuration-driven system for building, training, and deploying prediction models for predicting service provider account actions and activity. In particular, the operation of the Potential Consumer Engine is completely configurable and customizable by a user through a user-supplied configuration file such as a JavaScript Object Notation (JSON), eXtensible Markup Language (XML) file, etc.

For example, each module in the Potential Consumer Engine may have text associated with it in a configuration file(s) that describes how the module is configured, the inputs to the module, the operations to be performed by the module on the inputs, the outputs from the module, and so on. Accordingly, the user may rearrange the way these modules are connected together as well as the rules that the various modules use to perform various operations. Thus, whereas conventional prediction modelling is often performed in a fairly ad hoc and code driven manner, the modules of the Potential Consumer Engine may be configured in a modular and reusable fashion, to enable more efficient prediction modelling.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102. In some embodiments, the application servers 118 include Potential Consumer Engine 206. However, it is understood that the Potential Consumer Engine 206 can be implemented by any component(s) of system 102. It is also understood a portion of the Potential Consumer Engine 206 can be implemented by any component(s) of system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
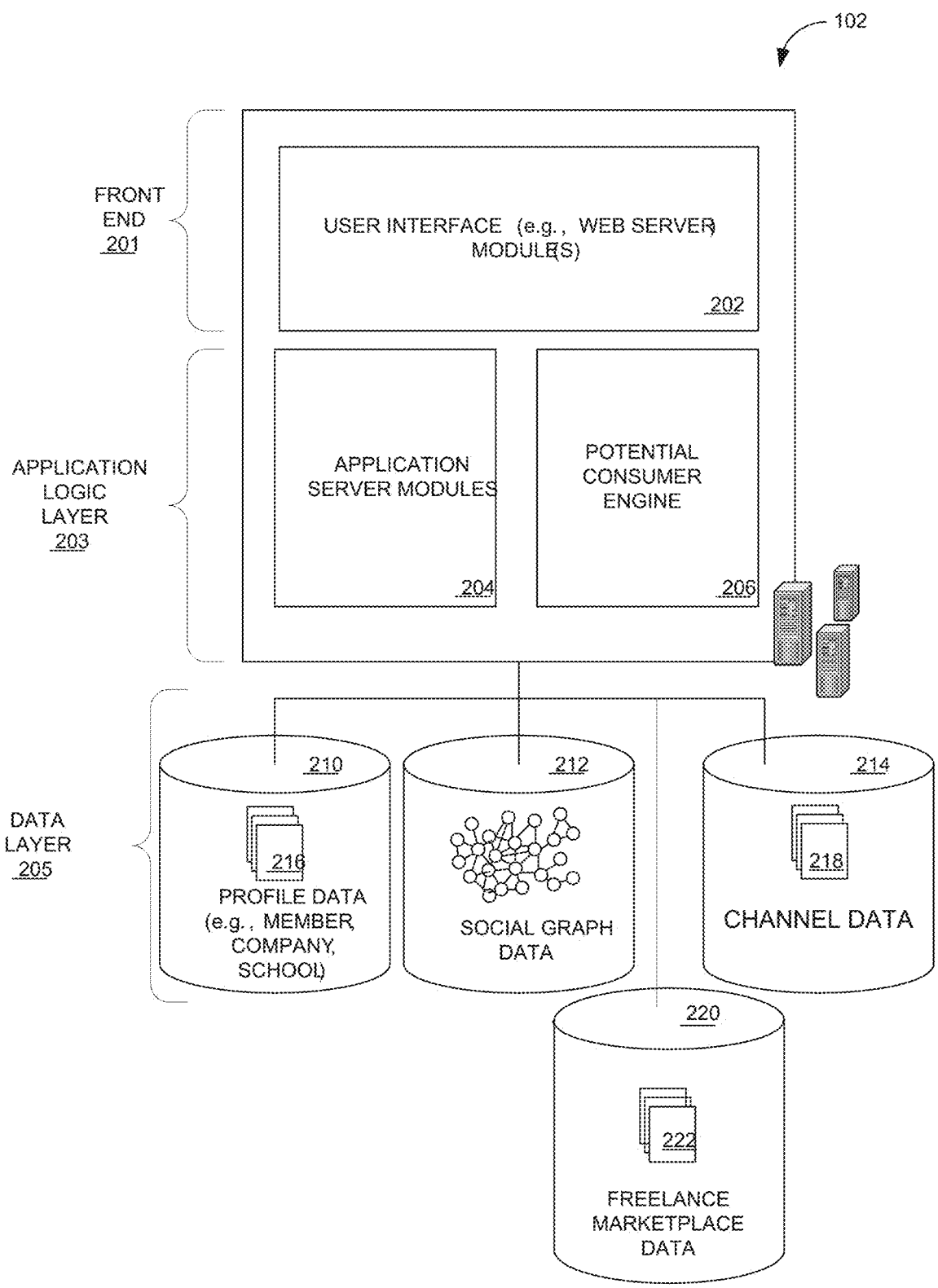
FIG. 2 is a block diagram of an example system, according to various embodiments.

FIG. 2 is a block diagram showing functional components of a professional social network within the networked system 102, in accordance with an example embodiment.

As shown in FIG. 2, the professional social network (also referred to herein as a social networking service or social network service) may be based on a three-tiered architecture, consisting of a front-end layer 201, an application logic layer 203, and a data layer 205. In some embodiments, the modules, systems, and/or Systems shown in FIG. 2 represent a set of executable software instructions and the corresponding hardware (e.g., memory and processor) for executing the instructions. To avoid obscuring the inventive subject matter with unnecessary detail, various functional modules and systems that are not germane to conveying an understanding of the inventive subject matter have been omitted from FIG. 2. However, one skilled in the art will readily recognize that various additional functional modules and systems are used with a professional social network such as that illustrated in FIG. 2, to facilitate additional functionality that is not specifically described herein. Furthermore, the various functional modules and systems depicted in FIG. 2 may reside on a single server computer, or be distributed across several server computers in various arrangements. Moreover, although a professional social network is depicted in FIG. 2 as a three-tiered architecture, the inventive subject matter is by no means limited to such architecture. It is contemplated that other types of architectures are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile attribute data as well as profile attribute data for various organizations. Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member (such as a member account) has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes allowed to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

As members interact with the various applications, services and content made available via the professional social network, the members' behaviour (e.g., content viewed, links or member-interest buttons selected, etc.) may be monitored and information 218 concerning the member's activities and behaviour may be stored, for example, as indicated in FIG. 2, by the channel data database 214, which includes stored instances 218 of various types of channel data for one or more member accounts. The data layer 205 further includes a freelancer marketplace data repository 220, which includes data regarding various types of services offered by one or more service provider member accounts, skills and specialties of service provider member accounts as well as data for processing transactions for proposals for services offered to one or more consumer member accounts. It is understood that the freelancer marketplace can also be referred to as a service provider marketplace.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the Potential Consumer Engine 206 as will be described in more detail below in conjunction with FIGS. 3-6. Although the Potential Consumer Engine 206 is referred to herein as being used in the context of a professional social network, it is contemplated that it may also be employed in the context of any website or online services, including, but not limited to, content sharing sites (e.g., photo- or video-sharing sites) and any other online services that allow users to have a profile and present themselves or content to other users. Additionally, although aspects of the present disclosure are referred to herein as being used or presented in the context of a web page, it is contemplated that any user interface view (e.g., a user interface on a mobile device or on desktop software) is within the scope of the present disclosure. It is understood that the Potential Consumer Engine 206 can be implemented in one or more of the application servers 118.

Figure 3:
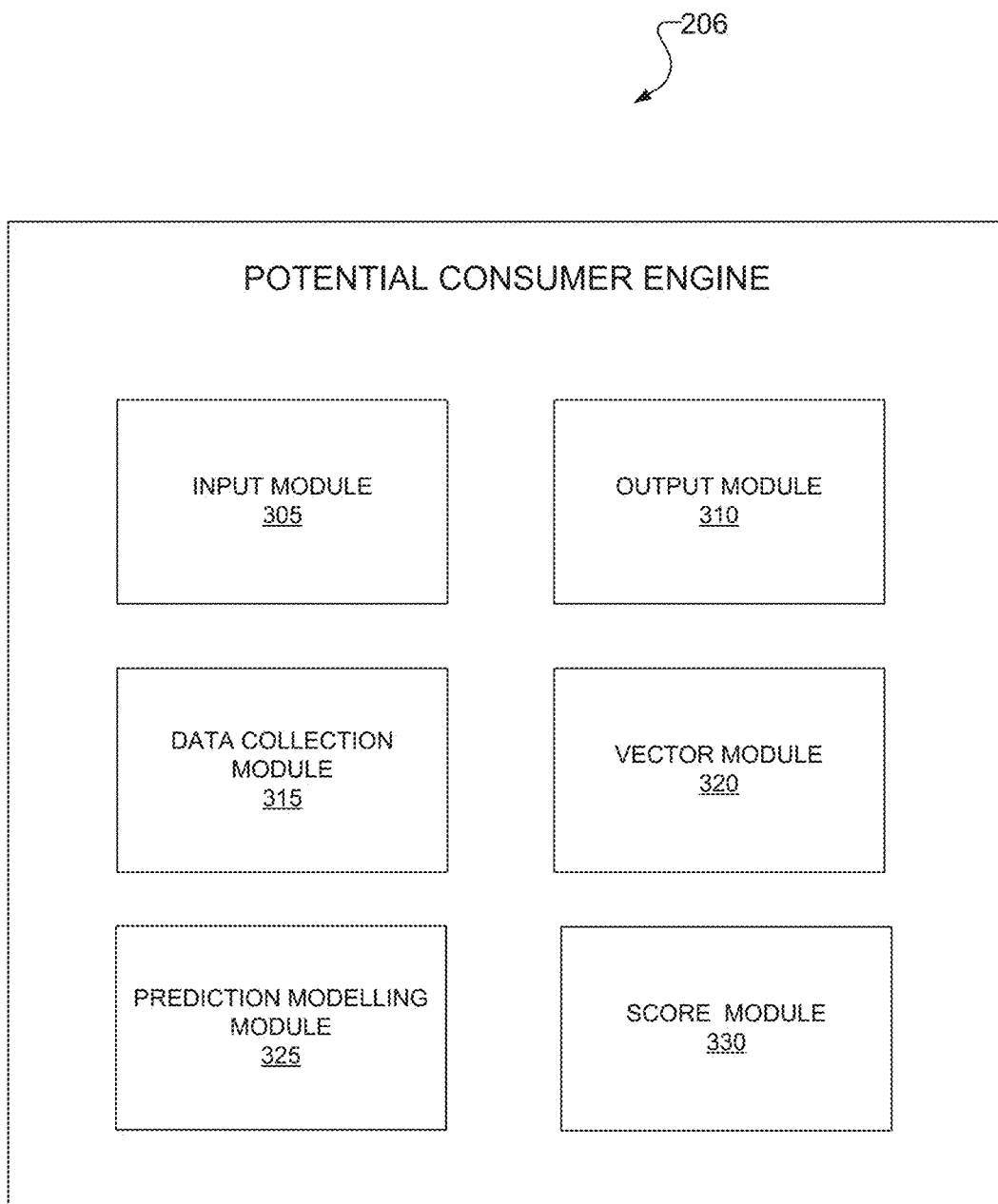
FIG. 3 is a block diagram showing example components of a Potential Consumer Engine, according to various embodiments.

FIG. 3 is a block diagram showing example components of a Potential Consumer Engine 206, according to some embodiments. As shown in FIG. 3, the Potential Consumer Engine 206 includes an input module 305, output module 310, data collection module 315, vector module 320, prediction modelling module 325 and a score module 330. While the modules 305, 310, 315, 320, 325, and 330 are described as performing specific operations, one of ordinary skill in the art will appreciate that such modules may be configured to perform alternative and/or additional operations.

The input module 305 is a hardware-implemented module that controls, manages and stores information related to any inputs from one or more components of system 102 as illustrated in FIG. 1 and FIG. 2. In various embodiments, inputs can include profile data and channel data of one or more member accounts. Input can also be training data based on a combination of profile data and channel data of the one or more member accounts.

The output module 310 is a hardware-implemented module which sends any outputs to one or more components of system 102 as illustrated in FIG. 1 and FIG. 2. In some embodiments, output can be a notification sent to a target member account identified as a member account associated with a measure of probability that the member account will join a freelancer market place or submit a request-for-proposal to one or more service provider accounts (also referred to as "service providers" or "service provider member accounts") in the freelancer marketplace.

The data collection module 315 is a hardware-implemented module which manages, controls, stores, and accesses information related to collecting profile data and channel data with respect to a period of time. For example, the data collection module 315 collects profile data and channel data of consumer accounts (also referred to as "consumer member accounts") from a pre-defined period of time. Such collected profile data and channel data can be sent to update and train a prediction model. In addition, the data collection module 315 collects profile data and channel data of a target member account for assembling a feature vector data of the target member account.

The vector module 320 is a hardware-implemented module which manages, controls, stores, and accesses information related to assembling a feature vector for a target member account. The vector module 320 assembles, according to encoded rules of a prediction model, feature vector data for the target member account based on collected profile data and the channel data. It is understood that each encoded rule comprises at least one pre-defined feature predictive of a measure of probability of the target member account joining the freelancer marketplace.

The prediction modelling module 325 is a hardware-implemented module which manages, controls, stores, and accesses information related to building, training and updating a prediction model. For example, the prediction modelling module 325 updates the pre-defined features of an encoded generalized linear mix model according to the collected profile data and channel data of consumer accounts in the freelancer marketplace.

The score module 330 is a hardware-implemented module which manages, controls, stores, and accesses information related to calculating a predictive output score. The predictive output score represents a current probability of the target member account joining the freelancer marketplace. The score module 330 compares the predictive output score to a threshold score to determine whether the predictive output score meets or exceeds the threshold score. The score module 330 triggers a notification for the target member account based on the predictive output score meeting or exceeding the threshold score.

Figure 4:
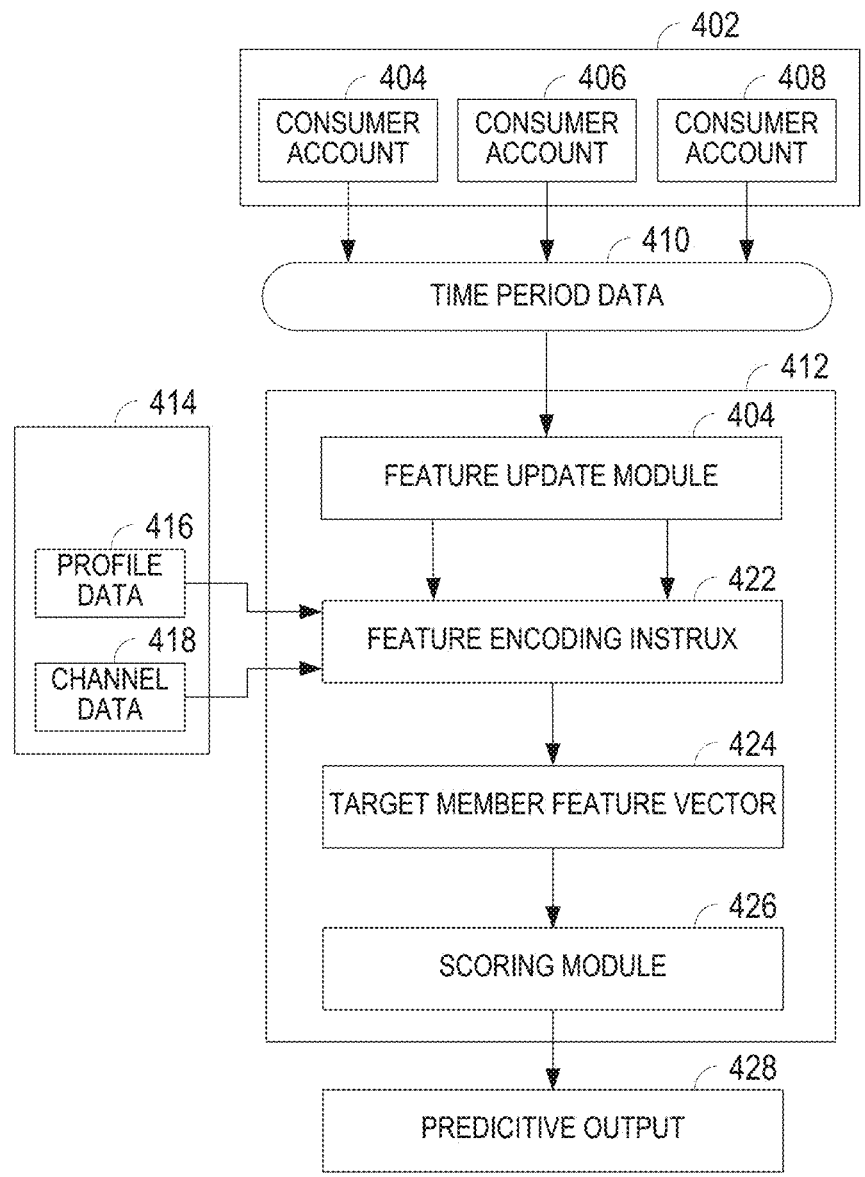
FIG. 4 illustrates a data flow diagram of a Potential Consumer Engine assembling a feature vector of a target member account, according to various embodiments.

FIG. 4 illustrates a data flow diagram of a Potential Consumer Engine assembling a feature vector of a target member account, according to various embodiments;

According to various exemplary embodiments, the Potential Consumer Engine 206 builds, trains, and updates a prediction model 412, such as an encoded generalized linear mix model, to identify a target member account 414 of a social network service who is most likely to join a freelancer marketplace 402 hosted within the social network service. The encoded generalized linear mix model includes one or more instructions for executing the analysis of data according to an extension of a linear mixed model that allows one or more response variables from different distributions, such as binary responses.

The Potential Consumer Engine 206 identifies a plurality of consumer member accounts 404, 406, 408 that have submitted requests-for-proposals in the freelancer marketplace 402. The Potential Consumer Engine 206 processes raw profile data and channel data from a period of time 410 of the plurality of consumer member accounts 404, 406, 408. The Potential Consumer Engine 206 defines the behaviours and attributes in the data from the period of time 410 as being predictive of whether the target member account 414 may join the freelancer marketplace 402 or submit a request-for-proposal to a particular service provider in the freelancer marketplace 402. It is understood that embodiments described herein are not limited to a specific number of consumer member accounts.

Channel data refers to different types of member account behaviours that occur internal or external to the social network service. External search channel data comprises target member account activity with respect to a webpage from the social network service that appears in a search result of a search engine service that is external to the social network service. Social network channel data comprises target member account activity with respect to viewing profiles of service providers in the freelancer marketplace. For example, the Potential Consumer Engine 206 detects that the target member account 414 visits a threshold number of service provider account profiles in the freelancer marketplace, where each viewed service provider account profile is associated with a same type of service. The Potential Consumer Engine 206 determines whether any of the views of the service provider account profiles occurred within a certain number of days, or within a certain number of sessions. If so, such profile viewing behaviour is social network channel data to be utilized by the Potential Consumer Engine 206 as data for a type of a pre-defined feature.

In order to collect time period data 410, the Potential Consumer Engine 206 processes raw profile data and channel data for each of the plurality of consumer member accounts 404, 406, 408 from a pre-submission period of time. The pre-submission period of time is an amount of time before each respective consumer member account 404, 406, 408 submitted a request-for-proposal to the freelancer marketplace 402 (or joined the freelancer marketplace 402). For example, the pre-submission period of time may be set to seven days. For a first consumer member account 404, the Potential Consumer Engine 206 identifies first raw profile data of the consumer member account 404 that was accessible in the social network service within seven days prior to when the first consumer account 404 submitted a request-for-proposal to the freelancer marketplace 402. The Potential Consumer Engine 206 further identifies first channel data generated by the first consumer member 404 account during those seven days before the first consumer account 404 submitted a request-for-proposal to the freelancer marketplace 402.

For a second consumer member account 406, the Potential Consumer Engine 206 identifies second raw profile data of the second consumer member account 406 that was accessible in the social network service within seven days prior to when the second consumer account 404 submitted a request-for-proposal to the freelancer marketplace 402. The Potential Consumer Engine 206 further identifies second channel data generated by the second consumer member account during those seven days before the second consumer account submitted a request-for-proposal to the freelancer marketplace 402. In another embodiment, the period of time may be a pre-registration period of time. A pre-registration period of time is an amount of time before a respective consumer member account registered to join the freelancer marketplace.

A feature update module 420 of the Potential Consumer Engine 206 updates pre-defined features of the prediction model 412 according to the period of time data 410 of each consumer member account 404, 406, 408. The prediction model 412 is thereby updated by the Potential Consumer Engine 206 and modelled to provide a statistical bias towards the behaviours and attributes of the consumer member accounts 404, 406, 408 that are associated with the period of time data 410.

The Potential Consumer Engine 206 generates feature encoding instructions 422 for assembling feature vectors based on the updated pre-defined features from the feature update module 420 and data 416, 418 of a target member account 414. The Potential Consumer Engine 206 assembles a feature vector 424 for the target member account 414 to be input into the scoring module 426 of the prediction model 412.

The feature vector 424 of the target member account 414 includes one or more feature vector units. For example, a first feature vector unit includes a portion of raw profile data 416 of the target member account 414 currently accessible in the social network service within a period of time that is equal to the length of the pre-submission period of time. That is, the Potential Consumer Engine 206 generates a feature vector unit(s) based on one or more portions of raw profile data 416 of the target member account 416 from the most recent seven days. The Potential Consumer Engine also generates a feature vector unit(s) based on one or more portions of channel data 418 of the target member account 414 created during the most recent seven days.

The Potential Consumer Engine 206 inputs the feature vector 424 for the target member account 414 into a scoring module 426 of the prediction model 412. The scoring module 426 calculates a predictive output score 428 according to the prediction model 412. The predictive output score 428 represents a measure of a probability that the target member account 414 has a current need for a service that can be performed by one or more service provider accounts currently in the freelancer marketplace 402.

The Potential Consumer Engine 206 compares the predictive output score 428 for the target member 414 account against a threshold score. Upon determining that the predictive output score 428 meets or exceeds the threshold score, the Potential Consumer Engine 206 triggers a notification to be presented to the target member account 414. For example, the notification can be a message sent to the target member account 414 to request the target member account 414 to register for the freelancer marketplace 402. In another embodiment, the notification can be a selectable alert icon for presentation within a social network content feed of the target member account 414.

It is understood that the Potential Consumer Engine 206 is not limited to the encoded generalized linear mix model. Other models can be built, trained and implemented according to one of various prediction modeling techniques, such as a Naïve Bayes model, a support vector machines (SVM) model, a decision trees model, and a neural network model, all of which are understood by those skilled in the art.

Figure 5:
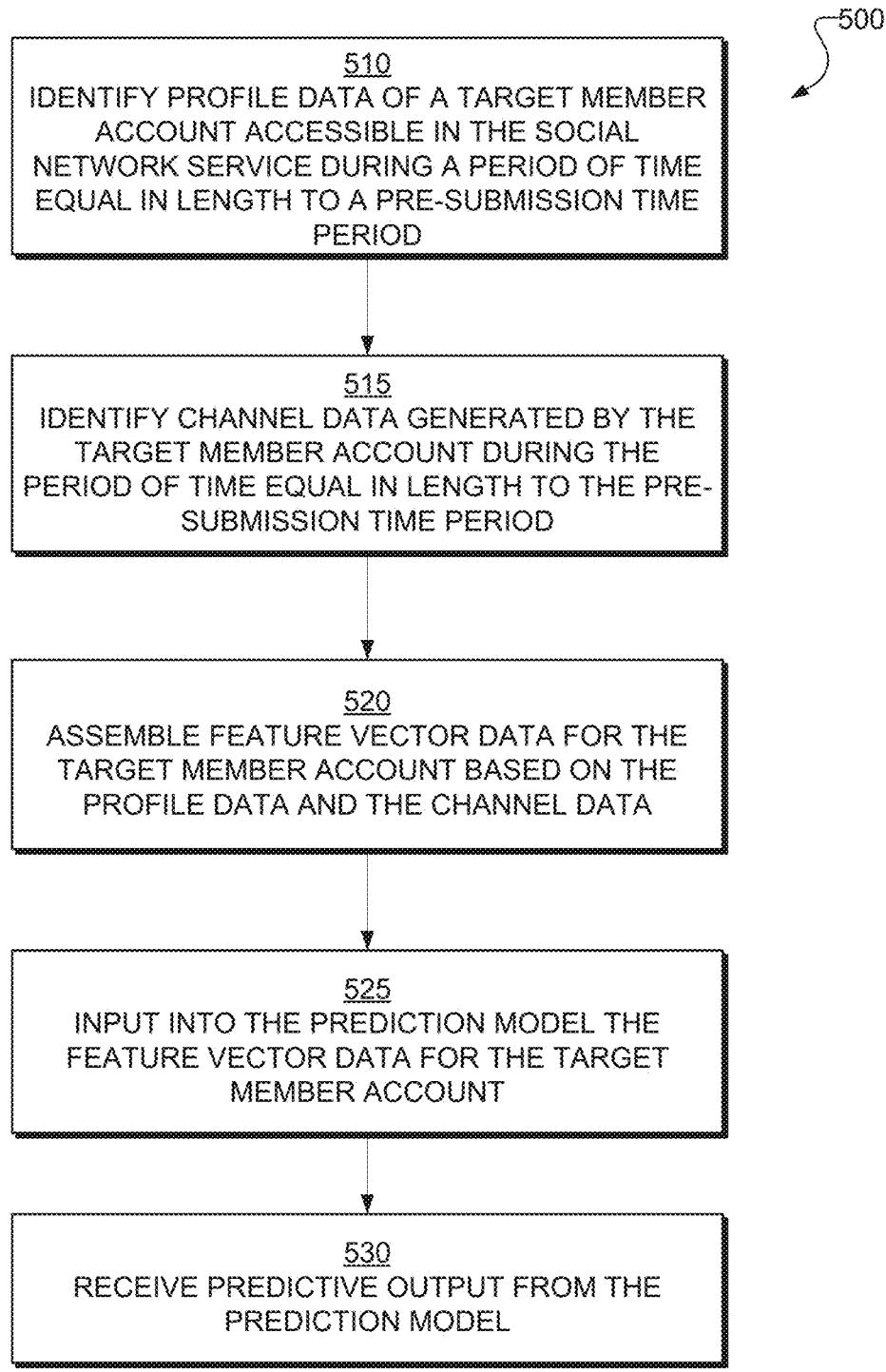
FIG. 5 is a flowchart illustrating an example method, according to various embodiments.

FIG. 5 is a flowchart illustrating an example method 500, according to various embodiments.

At operation 510, the Potential Consumer Engine 206 identifies profile data of a target member account accessible in the social network service during a period of time equal in length to a pre-submission time period. The pre-submission time period can be defined as an amount of time before a respective consumer member account submitted a request-for-proposal in a freelancer marketplace hosted in the social network service. The Potential Consumer Engine 206 utilizes one more portions of profile data as data for a type of as a pre-defined feature.

For example, profile data can be a number of social network connections of the target member account that have recommended or endorsed service provider account in the freelancer marketplace. Profile data can also be based on detecting the target member account has sent a social network connection invitation to a service provider account and/or whether that sent social network connection invitation has been accepted by the service provider account. Profile data can also be based on detecting the target member account has accepted a social network connection invitation from a service provider account. Profile data can also be based on detecting the target member account belongs to one or more freelancer groups within the social network service.

Profile data can be a job title change in the profile data of the target member account. Profile data can also be detecting the target member has updated a geographical region identifier. For example, the target member has changed the geographical region on their profile account from "New York City Area" to "S.F. Bay Area." Profile data can be a number of social network connections between the target member account and service provider accounts. Profile data can also be based on any type of profile attribute. The Potential Consumer Engine 206 utilizes the profile data as data for one or more types of pre-defined features.

At operation 515, the Potential Consumer Engine 206 identifies channel data generated by the target member account during the period of time equal in length to the pre-submission time period.

For example, social network channel data comprises search results from the social network service based on queries that include keywords that are associated with the freelancer marketplace. For example, a keyword listing for the freelancer marketplace includes a plurality of keywords where each keyword describes a type of service currently offered by a service provider account. The target member account submits a search query to a search engine of the social network service. The Potential Consumer Engine 206 compares one or more portions of the search query against the keyword listing. A keyword can be "freelance" or "contractor." If there is a match between any portion of the search query and one or more keywords in the keyword listing, the target member account's submission of the search query is also social network channel data to be utilized by the Potential Consumer Engine 206 as data for a type of as a pre-defined feature.

According to another example, the target member account submits a search query and the search engine of the social network service generates search results that include one or more profiles of service provider accounts in the freelancer account. Presence of the service provider account profiles in the search results can be to be utilized by the Potential Consumer Engine 206 as data for a type of as a pre-defined feature.

According to another example, the target member account 414 can be logged into the social network service and submit a search query to an external search engine service. The external search engine service returns search results which includes a link to a webpage generated by the social network service. The webpage generated by the social network service includes a listing of a plurality of service providers in the freelancer marketplace that provided a type of service (legal service, accounting services, life coaching, therapy). If the link for the webpage generated by the social network service is selected from the search results, the Potential Consumer Engine 206 receives an indication of such selection. Such selection of the link from the search results is external search channel data to be utilized by the Potential Consumer Engine 206 as data for a type of as a pre-defined feature.

According to another example, the Potential Consumer Engine 206 sends the target member account a message recommending the freelancer marketplace. The Potential Consumer Engine 206 detects whether the target member account accesses the message. Such access of the message is message channel data to be utilized by the Potential Consumer Engine 206 as data for a type of as a pre-defined feature. In another example, the Potential Consumer Engine 206 detects a message has been sent from the target member account to a service provider account in the freelancer marketplace. Such messaging to a service provider account is message channel data to be utilized by the Potential Consumer Engine 206 as data for a type of as a pre-defined feature.

At operation 520, the Potential Consumer Engine assembles, according to encoded rules of a prediction model, feature vector data for the target member account based on the profile data and the channel data. Each encoded rule of the prediction model defines at least one pre-defined feature predictive of a measure of probability of a given member account joining the freelancer marketplace.

For example, the Potential Consumer Engine 206 accesses feature vector encoding rules describing a vector position for each type of pre-define feature. More specifically, the feature vector encoding rules may state that, for example, a pre-defined feature based on a first type of channel data is to be stored at a position X1 of the target member account's vector, a pre-defined feature based on a second type of channel data is to be stored a position X2, a pre-defined feature based on a type of profile data is to be stored at a position X3. It is understood that the vector encoding rules are not limited to only three positions and three types of pre-defined features. Thus, the resulting feature vector includes various pre-defined features specific to types of profile data and types of channel data of the target member account. In addition, the encoding process may involve converting profile data and channel data into an internal representation (e.g., into a numerical value) for insertion into the feature vector, based on the feature vector encoding rules.

At operation 525, the Potential Consumer Engine 206 inputs into the prediction model the feature vector data for the target member account. The prediction model calculates a score according to a scoring algorithm. The score is calculated based on each feature vector data unit in the feature vector data for the target member account.

At operation 530, the Potential Consumer Engine 206 receives predictive output from the prediction model. The predictive output indicative of a current probability of the target member account joining the freelancer marketplace. If the predictive output meets or exceeds a threshold score, the Potential Consumer Engine 206 generates a notification or a message for the target member account to recommend that the target member account join the freelancer marketplace.

Figure 6:
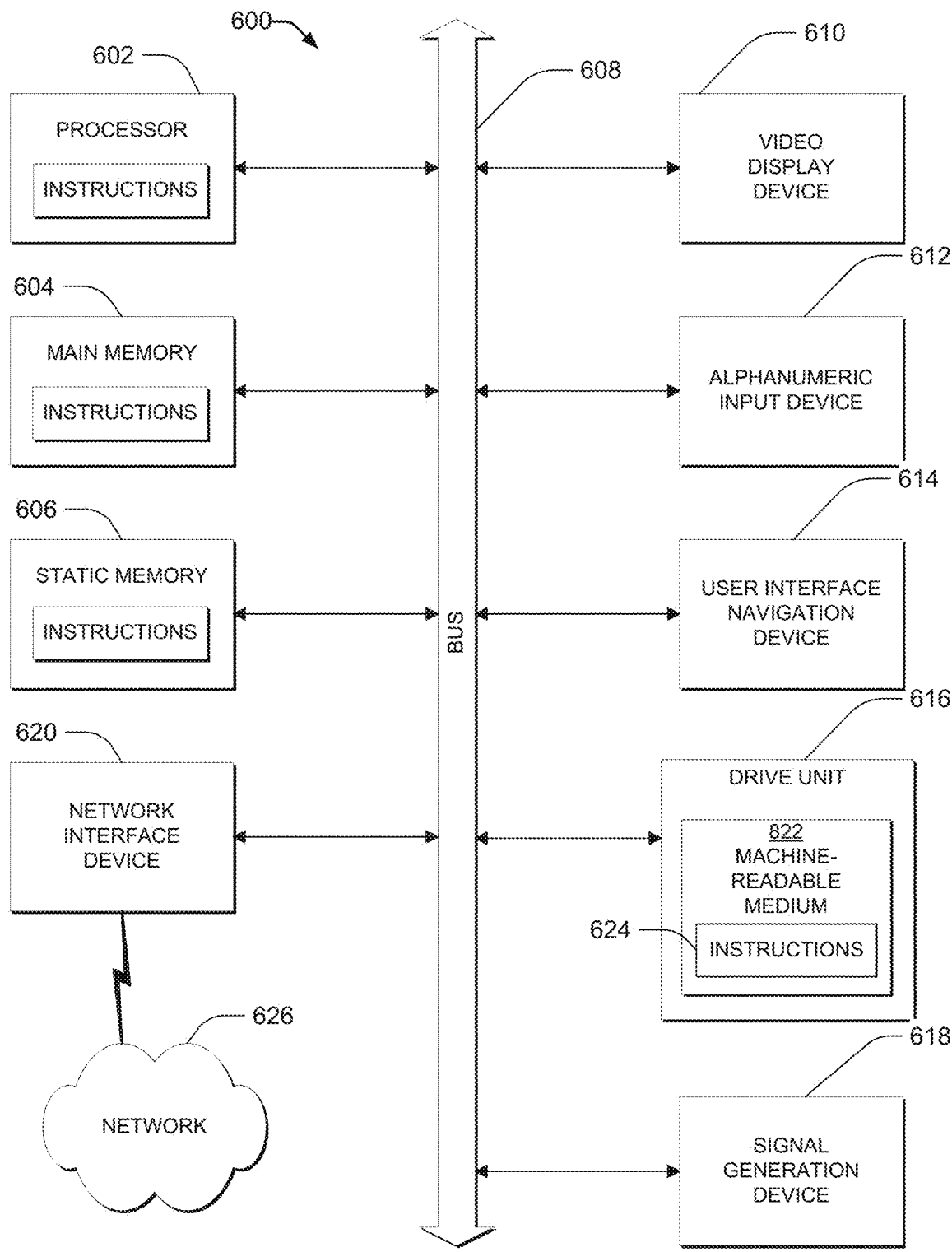
FIG. 6 is a diagrammatic representation of a machine in the example form of a computer system within which a set of instructions, for causing the machine to perform any one or more of the methodologies discussed herein, may be executed according to various embodiments.

FIG. 6 is a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes a processor 602 (e.g., a central processing unit (CPU), a graphics processing unit (GPU) or both), a main memory 604, and a static memory 606, which communicate with each other via a bus 608. Computer system 600 may further include a video display device 610 (e.g., a liquid crystal display (LCD) or a cathode ray tube (CRT)). Computer system 600 also includes an alphanumeric input device 612 (e.g., a keyboard), a user interface (UI) navigation device 614 (e.g., a mouse or touch sensitive display), a disk drive unit 616, a signal generation device 618 (e.g., a speaker) and a network interface device 620.

Disk drive unit 616 includes a machine-readable medium 622 on which is stored one or more sets of instructions and data structures (e.g., software) 624 embodying or utilized by any one or more of the methodologies or functions described herein. Instructions 624 may also reside, completely or at least partially, within main memory 604, within static memory 606, and/or within processor 602 during execution thereof by computer system 600, main memory 604 and processor 602 also constituting machine-readable media.

While machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 624 may further be transmitted or received over a communications network 626 using a transmission medium. Instructions 624 may be transmitted using network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system, comprising:
    a processor;
    a memory device holding an instruction set executable on the processor to cause the computer system to perform operations comprising:
        training a prediction model by passing sample profile data and sample channel data corresponding to the sample profile data to a machine learning algorithm, the training comprising updating predefined features of an encoded generalized linear mix model according to the sample profile data and sample channel data, the prediction model trained to output a probability that a user joins a freelancer marketplace, the freelancer marketplace being an online service where a plurality of service providers offer services for sale and where a plurality of potential buyers can post requests-for-proposal, each request-for-proposal indicating a service that a potential buyer intends to purchase;
        identifying, from profile data collected prior to and subsequent to when a respective consumer member account submitted a request-for-proposal in a freelancer marketplace hosted in the social network service, a subset of profile data of a target member account, the subset of profile data only containing data accessible in the social network service during a pre-submission time period, the pre-submission time period comprising a preset amount of time and ending when a respective consumer member account submitted the request-for-proposal in a freelancer marketplace hosted in the social network service;
        identifying a subset of channel data generated by the target member account, the subset of channel data only containing data accessible in the social network service during the period of time equal in length to the pre-submission time period;
        assembling, according to encoded rules of a prediction model, feature vector data for the target member account based on the subset of the profile data and the subset channel data, wherein each encoded rule comprises at least one pre-defined feature predictive of a measure of probability of a given member account joining the freelancer marketplace;
        inputting into the prediction model the feature vector data for the target member account; and
        receiving predictive output from the prediction model, the predictive output indicative of a current probability of the target member account joining the freelancer marketplace.

2. The computer system of claim 1, wherein assembling, according to encoded rules of a prediction model, feature vector data for the target member account comprises:
    identifying profile data of the target member account accessible in the social network service during a most-recent period of time equal in length to the pre-submission time period;
    identifying channel data generated by activity of the target member account during the most-recent period of time equal in length to the pre-submission time period; and
    generating each feature vector unit data based on at least one of a portion of the profile data of the target member account and a portion of the channel data generated by activity of the target member account.

3. The computer system of claim 2, wherein identifying channel data generated by activity of the target member account during the most-recent period of time equal in length to the pre-submission time period comprises:
    receiving, during the most-recent period of time equal in length to the pre-submission time period, an indication of a selection of a service provider webpage from a search result provided by an external search service, the search result generated while the target member account is logged into the social network service; and identifying the indication of the selection of the service provider webpage as external search channel data for a feature vector data unit.

4. The computer system of claim 2, wherein identifying channel data generated by activity of the target member account during the most-recent period of time equal in length to the pre-submission time period comprises:

receiving in the social network service, during the most-recent period of time equal in length to the pre-submission time period, a search query with at least one keyword matching a portion of a keyword listing for the freelancer marketplace; and identifying the at least one keyword from the search query as social network channel data for a feature vector data unit.

5. The computer system of claim 2, wherein identifying profile data of the target member account accessible in the social network service during a most-recent period of time equal in length to the pre-submission time period comprises:

identifying an update of a geographic region identifier in profile account data of the target member during the most-recent period of time equal in length to the pre-submission time period.

6. The computer system of claim 2, wherein identifying channel data generated by activity of the target member account during the most-recent period of time equal in length to the pre-submission time period comprises:

detecting a view of a service provider profile page in the freelancer marketplace during the most-recent period of time equal in length to the pre-submission time period; and identifying the view of the service provider profile page as social network channel data for a feature vector data unit.

7. The computer system of claim 2, wherein identifying channel data generated by activity of the target member account during the most-recent period of time equal in length to the pre-submission time period comprises:

detecting a message sent from the target member account to a service provider account in the freelancer marketplace during the most-recent period of time equal in length to the pre-submission time period; and identifying occurrence of the message sent as message channel data for a feature vector data unit.

8. The computer system of claim 2, wherein identifying profile data of the target member account accessible in the social network service during a most-recent period of time equal in length to the pre-submission time period comprises:

determining a number of social network connections of the target member account that have submitted a recommendation of at least one service provider; and identifying the number of social network connections as profile data for a feature vector data unit.

9. A non-transitory computer-readable medium storing executable instructions thereon, which, when executed by a processor, cause the processor to perform operations including:

training a prediction model by passing sample profile data and sample channel data corresponding to the sample profile data to a machine learning algorithm, the training comprising updating predefined features of an encoded generalized linear mix model according to the sample profile data and sample channel data, the prediction model trained to output a probability that a user joins a freelancer marketplace, the freelancer marketplace being an online service where a plurality of service providers offer services for sale and where a plurality of potential buyers can post requests-for-proposal, each request-for-proposal indicating a service that a potential buyer intends to purchase;

identifying, from profile data collected prior to and subsequent to when a respective consumer member account submitted a request-for-proposal in a freelancer marketplace hosted in the social network service, a subset of profile data of a target member account, the subset of profile data only containing data accessible in the social network service during a a pre-submission time period, the pre-submission time period comprising a preset amount of time and ending when a respective consumer member account submitted the request-for-proposal in a freelancer marketplace hosted in the social network service;

identifying a subset of channel data generated by the target member account, the subset of channel data only containing data accessible in the social network service during the period of time equal in length to the pre-submission time period;

assembling, according to encoded rules of a prediction model, feature vector data for the target member account based on the subset of the profile data and the subset channel data, wherein each encoded rule comprises at least one pre-defined feature predictive of a measure of probability of a given member account joining the freelancer marketplace;

inputting into the prediction model the feature vector data for the target member account; and receiving predictive output from the prediction model, the predictive output indicative of a current probability of the target member account joining the freelancer marketplace.

10. The non-transitory computer-readable medium of claim 9, wherein assembling, according to encoded rules of a prediction model, feature vector data for the target member account comprises:

identifying profile data of the target member account accessible in the social network service during a most-recent period of time equal in length to the pre-submission time period;

identifying channel data generated by activity of the target member account during the most-recent period of time equal in length to the pre-submission time period; and generating each feature vector unit data based on at least one of the profile data of the target member account and channel data generated by activity of the target member account.

11. The non-transitory computer-readable medium of claim 10, wherein identifying channel data generated by activity of the target member account during the most-recent period of time equal in length to the pre-submission time period comprises:

receiving, during the most-recent period of time equal in length to the pre-submission time period, an indication of a selection of a service provider webpage from a search result provided by an external search service, the search result generated while the target member account is logged into the social network service; and identifying the indication of the selection of the service provider webpage as external search channel data for a feature vector data unit.

12. The non-transitory computer-readable medium of claim 10, wherein identifying channel data generated by activity of the target member account during the most-recent period of time equal in length to the pre-submission time period comprises:

receiving in the social network service, during the most-recent period of time equal in length to the pre-submission time period, a search query with at least one keyword matching a portion of a keyword listing for the freelancer marketplace; and identifying the at least one keyword from the search query as social network channel data for a feature vector data unit.

13. The non-transitory computer-readable medium of claim 10, wherein identifying profile data of the target member account accessible in the social network service during a most-recent period of time equal in length to the pre-submission time period comprises:

identifying an update of a geographic region identifier in profile account data of the target member during the most-recent period of time equal in length to the pre-submission time period.

14. The non-transitory computer-readable medium of claim 10, wherein identifying channel data generated by activity of the target member account during the most-recent period of time equal in length to the pre-submission time period comprises:

detecting a view of a service provider profile page in the freelancer marketplace during the most-recent period of time equal in length to the pre-submission time period; and identifying the view of the service provider profile page as social network channel data for a feature vector data unit.

15. The non-transitory computer-readable medium of claim 10, wherein identifying channel data generated by activity of the target member account during the most-recent period of time equal in length to the pre-submission time period comprises:

detecting a message sent from the target member account to a service provider account in the freelancer marketplace during the most-recent period of time equal in length to the pre-submission time period; and identifying occurrence of the message sent as message channel data for a feature vector data unit.

16. The non-transitory computer-readable medium of claim 10, wherein identifying profile data of the target member account accessible in the social network service during a most-recent period of time equal in length to the pre-submission time period comprises:

determining a number of social network connections of the target member account that have submitted a recommendation of at least one service provider; and identifying the number of social network connections as profile data for a feature vector data unit.

17. A computer-implemented method, comprising:

training a prediction model by passing sample profile data and sample channel data corresponding to the sample profile data to a machine learning algorithm, the training comprising updating predefined features of an encoded generalized linear mix model according to the sample profile data and sample channel data, the prediction model trained to output a probability that a user joins a freelancer marketplace, the freelancer marketplace being an online service where a plurality of service providers offer services for sale and where a plurality of potential buyers can post requests-for-proposal, each request-for-proposal indicating a service that a potential buyer intends to purchase;

identifying, from profile data collected prior to and subsequent to when a respective consumer member account submitted a request-for-proposal in a freelancer marketplace hosted in the social network service, a subset of profile data of a target member account, the subset of profile data only containing data accessible in the social network service during a a pre-submission time period, the pre-submission time period comprising a preset amount of time and ending when a respective consumer member account submitted the request-for-proposal in a freelancer marketplace hosted in the social network service;

identifying a subset of channel data generated by the target member account, the subset of channel data only containing data accessible in the social network service during the period of time equal in length to the pre-submission time period;

assembling, according to encoded rules of a prediction model, feature vector data for the target member account based on the subset of the profile data and the subset channel data, wherein each encoded rule comprises at least one pre-defined feature predictive of a measure of probability of a given member account joining the freelancer marketplace;

inputting into the prediction model the feature vector data for the target member account; and receiving predictive output from the prediction model, the predictive output indicative of a current probability of the target member account joining the freelancer marketplace.

18. The computer-implemented method of claim 17, wherein assembling, according to encoded rules of a prediction model, feature vector data for the target member account comprises:

identifying profile data of the target member account accessible in the social network service during a most-recent period of time equal in length to the pre-submission time period;

identifying channel data generated by activity of the target member account during the most-recent period of time equal in length to the pre-submission time period; and generating each feature vector unit data based on at least one of the profile data of the target member account and channel data generated by activity of the target member account.

19. The computer-implemented method of claim 18, wherein identifying channel data generated by activity of the target member account during the most-recent period of time equal in length to the pre-submission time period comprises:

receiving, during the most-recent period of time equal in length to the pre-submission time period, an indication of a selection of a service provider webpage from a search result provided by an external search service, the search result generated while the target member account is logged into the social network service; and identifying the indication of the selection of the service provider webpage as external search channel data for a feature vector data unit.

20. The computer-implemented method of claim 18, wherein identifying channel data generated by activity of the target member account during the most-recent period of time equal in length to the pre-submission time period comprises:

receiving in the social network service, during the most-recent period of time equal in length to the pre-submission time period, a search query with at least one keyword matching a portion of a keyword listing for the freelancer marketplace; and identifying the at least one keyword from the search query as social network channel data for a feature vector data unit.

* * * * *